US012799320B2

(12) United States Patent
Adam et al.

(10) Patent No.: US 12,799,320 B2
(45) Date of Patent: Nov. 17, 2026

(54) PACKAGING

(71) Applicants: COLORMATRIX HOLDINGS, INC., Wilmington, DE (US); AVIENT CORPORATION, Avon Lake, OH (US)

(72) Inventors: Michaël Adam, Pommerloch (LU); Adrian Carmichael, Knowsley (GB); Mark Dixon, Knowsley (GB); Grégory Renard, Assesse (BE)

(73) Assignees: AVIENT CORPORATION, Avon Lake, OH (US); COLORMATRIX HOLDINGS, INC., Wilmington, DE (US)

( * ) Notice: Subject to any disclaimer, the term of this patent is extended or adjusted under 35 U.S.C. 154(b) by 1026 days.

(21) Appl. No.: 17/773,242

(22) PCT Filed: Oct. 15, 2020

(86) PCT No.: PCT/IB2020/059702

§ 371 (c)(1),
(2) Date: Apr. 29, 2022

(87) PCT Pub. No.: WO2021/084363

PCT Pub. Date: May 6, 2021

(65) Prior Publication Data

US 2022/0372277 A1 Nov. 24, 2022

(30) Foreign Application Priority Data

Oct. 30, 2019 (GB) .................................... 1915770

(51) Int. Cl.

| | |
|---|---|
| ***C08L 67/02*** | (2006.01) |
| ***B65D 1/02*** | (2006.01) |
| ***B65D 81/26*** | (2006.01) |
| ***B65D 81/30*** | (2006.01) |

(52) U.S. Cl.

CPC ............ *C08L 67/02* (2013.01); *B65D 1/0207* (2013.01); *B65D 81/266* (2013.01); *B65D 81/30* (2013.01); *C08L 2201/08* (2013.01); *C08L 2203/10* (2013.01); *C08L 2205/03* (2013.01)

(58) Field of Classification Search

None

See application file for complete search history.

(56) References Cited

U.S. PATENT DOCUMENTS

| | | | | |
|---|---|---|---|---|
| 5,639,815 A | | 6/1997 | Cochran et al. | |
| 6,083,585 A | * | 7/2000 | Cahill | B65D 1/0215 525/445 |
| 2001/0031802 A1 | * | 10/2001 | Murschall | C08G 61/12 524/1 |
| 2002/0031802 A1 | | 3/2002 | Hu et al. | |
| 2002/0160215 A1 | | 10/2002 | Peiffer et al. | |
| 2015/0210420 A1 | * | 7/2015 | Hosokoshiyama | B29C 49/08 215/44 |
| 2022/0002537 A1 | | 1/2022 | Werink et al. | |

FOREIGN PATENT DOCUMENTS

| | | | |
|---|---|---|---|
| CA | 2741281 | A1 | 6/2010 |
| EP | 3023458 | A1 | 5/2016 |
| JP | 201730244 | A | 2/2017 |
| JP | 201730251 | A | 2/2017 |
| JP | 2017030244 | A | 2/2017 |
| JP | 2017030251 | A | 2/2017 |
| WO | 2011099486 | A1 | 8/2011 |
| WO | 2017154849 | A1 | 9/2017 |
| WO | 2018112036 | A1 | 6/2018 |
| WO | 2019117725 | A1 | 6/2019 |
| WO | 2019133713 | A1 | 7/2019 |
| WO | 2020251361 | A1 | 12/2020 |

OTHER PUBLICATIONS

Topas Advance Polymers, "Cyclic Olefin Copolymer", dated Sep. 2019; 19 pages.
International Preliminary Report on Patentability for PCT/IB2020/059702, dated May 3, 2022, 6 pages.
Search Report for GB1915770.0, dated Mar. 27, 2020, 2 pages.
International Search for PCT/IB2020/059702, dated Mar. 2, 2021, 2 pages.
Search Report for Application No. GB1915770.9, dated Mar. 27, 2020, 2 pages.
Office Action for Canadian Patent Application No. 3,158,020, dated Dec. 6, 2023, 4 pages.

* cited by examiner

*Primary Examiner* — Robert T Butcher
(74) *Attorney, Agent, or Firm* — Lippes Mathias LLP

(57) ABSTRACT

A preform is made by mixing cyclic olefin copolymer (COC) and light shielding pigment(s) with PET. The preform is stretch-blow moulded to produce a bottle which may be white and opaque. Light may be restricted from entering the bottle to thereby restrict degradation of the bottle contents from certain wavelengths of visible light.

22 Claims, 5 Drawing Sheets

PACKAGING

This invention relates to packaging and materials therefor. Preferred embodiments relate to containers, such as PET bottles, which are white in colour and are arranged to block and/or restrict light from entering the container to reduce the risk of the contents of the container degrading during storage due to exposure to light.

It is known to produce containers with light protection obtained by incorporating inorganic shielding fillers into PET. For example, EP3023458A1 relates to a single-layer plastic container with light shielding, wherein the procedure to incorporate a light-shielding filler is performed by adding, to a main PET plastic base, a concentrated additive that contains a high impact polystyrene (HIPS) and/or polypropylene (PP) polymer base in which inorganic shielding fillers that contain $TiO_2$ and Al have previously been dispersed.

Other plastic containers which address the same problem to protect their contents (e.g. UHT long-life milk) from light radiation are available in different plastic media and with different types of structures, for example: three-layer polyethylene, three-layer PET, two-layer PET or single-layer PET.

Conventionally, plastic containers that incorporate light protection have a white-coloured surface due to the fact that one of the most widespread uses for such containers is the bottling of long-life milk (e.g. UHT milk) and/or UHT milk products. There are known solutions to the problem in which $TiO_2$, a white pigment with a high concealing power, is combined with light absorbers that effectively reinforce the shield provided by the $TiO_2$. However, these light absorbers necessarily darken the surface of the containers rendering an unattractive and undesirable greyish colour and this means that the concentrations that can be used in the containers and hence the threshold of their efficacy are limited.

EP3023458A1 addresses the problem of darkening in single-layer containers by using aluminium, since its shielding efficacy is based on a reflecting effect and not on light absorption which means that the container surface tends to reflect light. By using aluminium, it is suggested that a surface is produced which has a greater luminosity and consequently the proportion of aluminium that can be used is greater than that of conventional absorbers, affording very high shielding options without detrimental alterations to the colour of containers. However, whilst aluminium is very effective at light shielding, it is a major contributor to a darker colour. Consequently, the level of aluminium needs to be selected to balance colour vs light shielding.

Containers as described in EP3023458A1 disadvantageously incorporate high levels of $TiO_2$ which is undesirable, since there is a general desire to reduce the amounts of inorganic additives in containers, to improve recyclability. In addition, whilst containers produced as described in EP3023458A1 are improved as compared to containers which were available before, the containers still have a relatively dark appearance, which is undesirable.

WO2019/117725A1 (Holland Colours) addresses the problem of preparing polyester-based preforms and containers which provide light protection when the content of mineral opacifying agents in the container is below 4% by total weight, whilst maintaining a white appearance. In particular, a stated object of the invention described is said to be to provide a concentrate from which polyester preforms and containers may be manufactured containing less than 4% by total weight of titanium dioxide without significantly reducing the light protection and white appearance. The solution to the problem described in WO2019/117725 is to lower the titanium dioxide content and introduce polymethylpentene into the preform/container produced.

WO2019/133713A1 (Penn Colour) relates to packaging with a high lightness value, high light blocking, a low percentage of additives, and a goniochromatic appearance (uniform colour across all viewing angles). The invention is said to be based on the discovery that using polymethylpentene and a light shielding pigment (in particular, titanium dioxide) has an unexpected synergistic effect, even at very low addition levels for such components and creates a package wall with a goniochromatic appearance and excellent light blocking properties. The packaging is said to have a wall which includes a polyester combined with an oriented polymethylpentene and a light shielding pigment. About 0.1 to about 5.0 percent of the weight of the wall is polymethylpentene and about 0.1 to about 5.0 percent of the weight of the wall is a light shielding pigment. The ratio of polymethylpentene to light shielding pigment in the wall is from about 5:1 to about 1:5.

Whilst packaging materials as described above may be improved in some respects over previous proposals, there is room for further improvement.

It is an object of the invention to address problems associated with preforms for containers and/or containers per se.

It is an object of the invention to provide a preform and/or container which is substantially white and opaque, and provides excellent light protection for consumables, for example milk or milk-based consumables.

According to a first aspect of the invention, there is provided a container body which comprises:

(i) a polymer; and (ii) a cyclic olefin copolymer (COC).

A container suitably comprises said container body and a closure which suitably cooperates with the container body to close off the container body and/or seal it from the outside. Said container suitably defines a package which surrounds (or is arranged to surround) a product and/or which contains the product. The container body may include a sidewall constructed from said polymer and COC.

Said polymer may be a polyester or a polyolefin polymer, suitably of types used in containers and/or packaging. Said polymer is preferably a polyester.

A ratio (A) defined as the weight of polymer (eg polyester) divided by the weight of COC in the container body may be in the range 8 to 65, preferably in the range 10 to 45, more preferably in the range 10 to 40. In one preferred embodiment, said ratio (A) may be in the range 30-39; in another preferred embodiment said ratio (A) may be in the range 9-15.

A ratio (B) defined as the weight of polymer (eg polyester) divided by the weight of COC in a layer of the container body may be in the range 8 to 65, preferably in the range 10 to 45, more preferably in the range 10 to 40. In one preferred embodiment, said ratio (B) may be in the range 30-39; in another preferred embodiment said ratio (B) may be in the range 9-15. Said container body may comprise a multi-layer container body (eg comprising one white layer and a second superposed black layer). In preferred embodiments, said container body is defined by a single layer, in which case, said sidewall of the container body may consist of a single layer and ratio (B) suitably defines the weight of polymer (eg polyester) divided by the weight of COC in said single layer of the container body.

Said container body may include 1 to 10 wt % of COC, preferably 2 to 8 wt % of COC. Said container body may include 80 to 99 wt % of polymer (eg polyester). Said container body may include 80 to 99 wt % of polymer (eg polyester), 1 to 10 wt % of COC and 0 to 19 wt % of other ingredients. In one preferred embodiment, said container body includes 1.5 to 3.5 wt % of COC; in another preferred embodiment said container body includes 6.0 to 9.0 wt % of COC.

A single layer of said container body may include 1 to 10 wt % of COC, preferably 2 to 8 wt % of COC. A single layer of said container body may include 80 to 99 wt % of polyester, 1 to 10 wt % of COC and 0 to 19 wt % of other ingredients. In one preferred embodiment, a single layer of said container body may include 1.5 to 3.5 wt % of COC; in another preferred embodiment A, a single layer of said container body may include 6.0 to 9.0 wt % of COC.

Said COC may include a repeat unit of formula

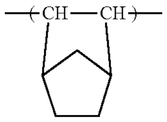

(I)

which may be optionally substituted (but is preferably not substituted).

Said COC may include a repeat unit of formula $$-(CH_2-CH_2)- \quad (II)$$

which may be optionally-substituted (but preferably is not substituted).

Said COC may include at least 40 mol %, preferably at least 45 mol %, of said repeat unit of formula I. It may include less than 70 mol % or less than 65 mol % of said repeat unit of formula I.

Said COC may include less than 60 mol %, preferably less than 55 mol % of said repeat unit of formula II. It may include at least 30 mol % or at least 35 mol % of said repeat unit of formula II.

Said COC may have a density in the range 1000 to 1050 $kg/m^3$, measured as described in ISO 1183.

Said COC may have a Melt Volume Rate (MVR), measured as described in ISO 1183 in the range 1 to 50 $cm^3/10$ mins. In some embodiments, the MVR may be less than 25 $cm^3/10$ mins.

Said COC may have a Tensile Modulus (1 mm/min), measured as described in ISO 527-2/1A of greater than 2700 MPa. It may be in the range 2750 to 3400 MPa.

Said COC may have a glass transition temperature (Tg) (10° C./min) measured as described in ISO 11357-1, -2, -3 of greater than 100° C., preferably greater than 130° C. Said Tg may be less than 190° C. Said Tg may be in the range 135° C. to 185° C.

Said COC may have a DTUL @ 0.45 MPa, measured as described in ISO 75-1, -2 of greater than 100° C., preferably greater than 120° C. The DTUL may be less than 190° C. Said DTUL may be in the range 118 to 180° C.

As stated, said polymer is preferably a polyester. Said polyester is preferably a polyethylene terephthalate which term, in the context of the present specification, is intended to encompass co-polyethylene terephthalates. Co-polyethylene terephthalates of polyethylene terephthalate may contain repeat units from at least 85 mole % terephthalic acid and at least 85 mole % of ethylene glycol. Dicarboxylic acids which can be included, along with terephthalic acid, are exemplified by phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid and sebacic acid. Other diols which may be incorporated in the co-polyethylene terephthalates, in addition to ethylene glycol, include diethylene glycol, triethylene glycol, 1,4-cyclohexanedimethanol, propane-1,3-diol, butane-1,4-diol, pentane-1,5-diol, hexane-1,6-diol, 3-methylpentane-2,4-diol, 2-methyl pentane-1,4-diol, 2,2,4-trimethylpentane-1,3-diol, 2-ethylhexane-1,3-diol, 2,2-diethylpropane-1,3-diol, hexane-1,3-diol, 1,4-di(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. In a preferred embodiment said polyethylene terephthalate has less than 10 mole %, more preferably less than 6 mole % especially less than 2 mole % comonomer substitution. Preferably, said co-polyethylene terephthalate does not comprise co-polyethylene terephthalate; it suitably comprises substantially a homopolymer produced by esterification or transesterification of terephthalic acid or dimethyl terephthalate and ethylene glycol to produce bis(2-hydroxyethyl) terephthalate which is then subjected to polycondensation at high temperatures in vacuum in the presence of a catalyst.

Said polymer (eg polyester) may have a Tg of less than 90° C., for example of less than 85° C. The Tg may be at least 60° C. or 65° C.

The difference between the Tg of the polymer (eg polyester) and that of said COC may be at least 30° C.; the difference may be less than 90° C., or less than 60° C.

As used herein the term "IV" refers to the Inherent Viscosity of the polymeric material. It may be determined on a solution of 0.5 g of polymer dissolved in 100 ml of a mixture of phenol (60% by volume) and tetrachloroethane (40% by volume).

The IV of the polymer (eg polyester) is preferably greater than 0.5 dL/g, more preferably greater than 0.65 dL/g.

Said polymer (eg polyester) and said COC are preferably not wholly miscible. Hence, a mixture comprising said polymer (eg polyester) and COC may include observable regions of COC dispersed in the polymer (eg polyester).

The sum of the wt % of thermoplastic polymers (eg polyester(s)) and COC(s) in said container body may be at least 80 wt %, preferably at least 90 wt %, more preferably at least 94 wt %.

The sum of the wt % of thermoplastic polymers (eg polyester(s)) and COC(s) in a container (excluding any closure thereof) which includes said container body may be at least 80 wt %, preferably at least 90 wt %, more preferably at least 94 wt %.

As described, said container body preferably comprises polyester. Said container body preferably comprises a polyester as the major thermoplastic polymer in the container body. Polyester (especially PET) preferably makes up at least 85 wt %, preferably at least 95 wt %, of the total amount of thermoplastic polymers in the container body. When the container body includes other thermoplastic polymers, such polymers may be selected from PP, PO, PMMA, TPX, PLA, silicone polymers and HIPS. Said other thermoplastic polymers may be substantially incompatible with the polyester and/or my not be wholly miscible with the polyester included in the container body. Hence, a mixture comprising said polyester and said other polymer may include observable regions of the other polymer dispersed in the polyester.

Said container body may define a receptacle for example a bottle, suitably excluding any closure (e.g. cap) thereof.

Said container body may include a screw-threaded neck arranged to cooperate with a screw-threaded closure.

Said container body and/or a sidewall thereof preferably includes only one layer of material which suitably defines the container (excluding the closure thereof) Thus, said container body and/or a sidewall thereof preferably do not include any laminated region or multi-layered region.

Said container body may include a first light shielding pigment. Such a pigment may interact with incident light by primarily diffracting light and optionally scattering and/or absorbing. Diffraction occurs as a result of a difference in refractive index between the light shielding pigment and the COC or polyester. Light shielding pigments may solely diffract, as in the case of titanium dioxide ($TiO_2$), or they may both scatter and absorb, as in the case of black iron oxide (PBlk 11). Some examples of light shielding pigments include titanium dioxide ($TiO_2$), ultramarine blue (PB 29), metal oxide particles such as red iron oxide (PR 101), black iron oxide (PBlk 11), chromium green-black hematite (PG 17), cobalt aluminate (PB 28), aluminium trihydrate (Al (OH)3), barium sulfate ($BaSO_4$), zinc sulfide (ZnS), metal flake (eg aluminium or bronze flakes), calcium carbonate and mica.

Said first light shielding pigment is preferably titanium dioxide.

Said container body may include less than 8 wt %, preferably less than 6 wt %, more preferably less than 4.5 wt %, especially no more than 4 wt % of said first light shielding pigment. Said container body may include at least 1 wt % or at least 2 wt % of said first light shielding pigment. Said container body may include 1 to 4 wt % of said first light shielding pigment.

Said container body may include less than 8 wt %, preferably less than 6 wt %, more preferably less than 4.5 wt %, especially no more than 4 wt % of titanium dioxide. Said container body may include at least 1 wt % or at least 2 wt % of titanium dioxide. Said container body may include 1 to 4 wt % of titanium dioxide.

A single layer of said container body may include less than 8 wt %, preferably less than 6 wt %, more preferably less than 4.5 wt %, especially no more than 4 wt % of said first light shielding pigment. A single layer of said container body may include at least 1 wt % or at least 2 wt % of said first light shielding pigment. A single layer of said container body may include 1 to 4 wt % of said first light shielding pigment.

A single layer of said container body may include less than 8 wt %, preferably less than 6 wt %, more preferably less than 4.5 wt %, especially no more than 4 wt % of titanium dioxide. A single layer of said container body may include at least 1 wt % or at least 2 wt % of titanium dioxide. A single layer of said container body may include 1 to 4 wt % of titanium dioxide.

Said container body may include a second light shielding pigment. Said second light shielding pigment may be selected from titanium dioxide ($TiO_2$), ultramarine blue (PB 29), metal oxide particles such as red iron oxide (PR 101), black iron oxide (PBlk 11), chromium green-black hematite (PG 17), cobalt aluminate (PB 28), aluminium trihydrate (Al(OH)3), barium sulfate (BaSO4), zinc sulfide (ZnS), metal flake (eg aluminium or bronze flakes), calcium carbonate and mica. Said first and second light shielding pigments are preferably different and/or do not include all of the same elements.

In one embodiment, said container body includes 85-95 wt % polyester (eg PET), 1-8 wt % titanium dioxide, 1-8 wt % of COC, 0.01 to 1 wt % of aluminium flake or powder and 0 to 1.5 wt % of a polymer which is incompatible/immiscible with the polyester.

In a preferred embodiment, said container body includes 85-95 wt % polyester (eg PET), 1-5 wt % titanium dioxide, 1-7 wt % of COC, 0.01 to 0.5 wt % of aluminium flake or powder and 0 to 1.5 wt % of a polymer which is incompatible/immiscible with the polyester.

Said container body preferably comprises and/or is defined by a mixture, for example a substantially homogenous mixture, of said polymer and said cyclic olefin copolymer (COC) and, when provided, said first light shielding pigment and said second light shielding pigment.

Said container body may comprise virgin polymer (eg polyester) or recycled polymer (eg recycled PET).

When said container body includes virgin polyester, said container body, for example a sidewall thereof, preferably has a L* value, measured on the CIELAB scale as described herein, of at least 85, preferably at least 90.

When said container body includes recycled polyester, said container body, for example a sidewall thereof, preferably has a L* value, measured on the CIELAB scale as described herein, of at least 80.

Said container body is preferably part of a beverage container. It may have a volume of no more than 5 litres, for example no more than 2 litres or no more than 1 litre.

Said container body for example a sidewall thereof, may have a thickness of at least 100 microns or at least 200 microns. The thickness may be less than 500 microns or less than 400 microns.

Advantageously, it is found that said cyclic olefin copolymer (COC) does not significantly deactivate oxidizable organic materials for scavenging oxygen in the container body and which may be as described in GB2207439A or U.S. Pat. No. 6,083,585. Thus, the invention extends to a container body as described which incorporates an oxidizable organic material for scavenging oxygen in use. The oxidizable organic material may be mixed with the polymer and said cyclic olefin copolymer (COC).

The oxidizable organic material may be as described in GB2207439A or U.S. Pat. No. 6,083,585. It may comprise AMOSORB™ from Colormatrix, Monoxbar™ from Constar, Polyshield™ from Invista or ValOR from Valspar.

The oxidizable organic material may include an oxygen-scavenging polymer for example a polyolefin polymer or oligomer. Said container body may include a polyester which includes polyester segments and polyolefin oligomer segments, for example as described in U.S. Pat. No. 6,083,585. Said container body may include a catalyst for catalysing the oxidation of the oxidizable organic material.

According to a second aspect of the invention there is provided a preform for making a container body according to the first aspect, the preform comprising:

(i) a polymer (eg polyester);

(ii) a cyclic olefin copolymer (COC).

A ratio (C) defined as the weight of polymer (eg polyester) divided by the weight of COC in the preform may be in the range 8 to 65, preferably in the range 10 to 45, more preferably in the range 10 to 40. In one preferred embodiment, said ratio (C) may be in the range 30-39; in another preferred embodiment said ratio (C) may be in the range 9-15.

A ratio (D) defined as the weight of polymer (eg polyester) divided by the weight of COC in a layer of the preform may be in the range 8 to 65, preferably in the range 10 to 45, more preferably in the range 10 to 40. In one preferred embodiment, said ratio (D) may be in the range 30-39; in another preferred embodiment said ratio (D) may be in the range 9-15. Said preform may comprise a multi-layer container body (eg comprising one white layer and a second superposed black layer). In preferred embodiments, said preform is defined by a single layer, in which case, said sidewall of the preform may consist of a single layer and ratio (D) suitably defines the weight of polymer (eg polyester) divided by the weight of COC in said single layer of the preform.

Said preform may include 1 to 10 wt % of COC, preferably 2 to 8 wt % of COC. Said preform may include 80 to 99 wt % of polymer (eg polyester). Said preform may include 80 to 99 wt % of polymer (eg polyester), 1 to 10 wt % of COC and 0 to 19 wt % of other ingredients. Such other ingredients may comprise one or more further thermoplastic polymers and/or one or more light shielding pigments, for example said first or said second light shielding pigments described. In one preferred embodiment, said preform includes 1.5 to 3.5 wt % of COC; in another preferred embodiment said preform includes 6.0 to 9.0 wt % of COC.

Said COC may be as described in the first aspect.

Said polymer (eg polyester) may be as described in the first aspect.

The sum of the wt % of polyester(s) and COC(s) in said preform may be at least 80 wt %, preferably at least 90 wt %, more preferably at least 94 wt %.

Said preform preferably includes only one layer of material. It may comprise an injection moulding. It may be test-tube shaped.

Said preform may include a first light shielding pigment as described in the first aspect. Said first light shielding pigment is preferably titanium dioxide.

Said preform may include less than 8 wt %, preferably less than 6 wt %, more preferably less than 4.5 wt %, especially no more than 4 wt % of said first light shielding pigment. Said preform may include at least 1 wt % or at least 2 wt % of said first light shielding pigment. Said preform may include 1 to 4 wt % of said first light shielding pigment.

Said preform may include less than 8 wt %, preferably less than 6 wt %, more preferably less than 4.5 wt %, especially no more than 4 wt % of titanium dioxide. Said preform may include at least 1 wt % or at least 2 wt % of titanium dioxide. Said preform may include 1 to 4 wt % of titanium dioxide.

Said preform may include a second light shielding pigment as described according to the first aspect.

In one embodiment, said preform includes 85-95 wt % polyester (eg PET), 1-8 wt % titanium dioxide, 1-8 wt % of COC, 0.01 to 1 wt % of aluminium flake or powder and 0 to 1.5 wt % of a polymer which is incompatible/immiscible with the polyester.

In a preferred embodiment, said preform includes 85-95 wt % polyester (eg PET), 1-5 wt % titanium dioxide, 1-7 wt % of COC, 0.01 to 0.5 wt % of aluminium flake or powder and 0 to 1.5 wt % of a polymer which is incompatible/immiscible with the polyester.

According to a third aspect of the invention, there is provided a method of making a container body of the first aspect, the method comprising:

(i) selecting a preform according to the second aspect;
(ii) stretch blow moulding the preform to produce the container body of the first aspect.

Preferably, during said stretch blowing moulding the preform is not heated to a temperature which is greater than the Tg of the COC. Said preform is preferably stretch blow moulded at a temperature which is less than the Tg of the COC. Preferably, during said stretch blowing moulding the preform is not heated to a temperature which is greater than 130° C., or greater than 125° C. Said preform is preferably stretch blow moulded at a temperature which is less than 130° C., preferably less than 125° C.

According to a fourth aspect of the invention, there is provided a formulation for use in a method of making a preform according to the second aspect, the formulation comprising a cyclic olefin copolymer (COC) which is suitably as described in the first aspect.

Said formulation may include a first light shielding pigment as described in the first aspect. Said first light shielding pigment is preferably titanium dioxide.

Said formulation may include 20-70 wt % COC, 10-70 wt % of a first light shielding pigment, 0-5 wt % of a second light shielding pigment and 0-15 wt % of a thermoplastic polymer which is different from said COC (and which is incompatible/immiscible with the polymer which forms the main polymer in the preform).

In one embodiment, said formulation may include 15-35 wt % COC, 40-75 wt % of a first light shielding pigment, 0-5 wt % of a second light shielding pigment and 0-15 wt % of a thermoplastic polymer which is different from said COC (and which is incompatible/immiscible with the polymer which forms the main polymer in the preform).

In another embodiment, said formulation may include 45-70 wt % COC, 30-50 wt % of a first light shielding pigment, 0-3 wt % of a second light shielding pigment and 0-11 wt % of a thermoplastic polymer which is different from said COC (and which is incompatible/immiscible with the polymer which forms the main polymer in the preform).

Said formulation is preferably in the form of pellets.

According to a fifth aspect of the invention, there is provided a method of making a formulation according to the fourth aspect, the method comprising contacting said COC with said first light shielding pigment and/or other ingredients in the formulation. The method may comprise mixing said COC with said first light shielding pigment and/or other ingredients. The method may comprise extruding said COC with said first light shielding pigment and/or other ingredients in the formulation. An extrudate may be formed into pellets which may comprise masterbatch pellets.

Any feature of any aspect of any invention or embodiment described herein may be combined with any feature of any aspect of any other invention or embodiment described herein mutatis mutandis.

Specific embodiments of the invention will now be described, by way of example, with reference to the accompanying figures in which.

Figure 1:
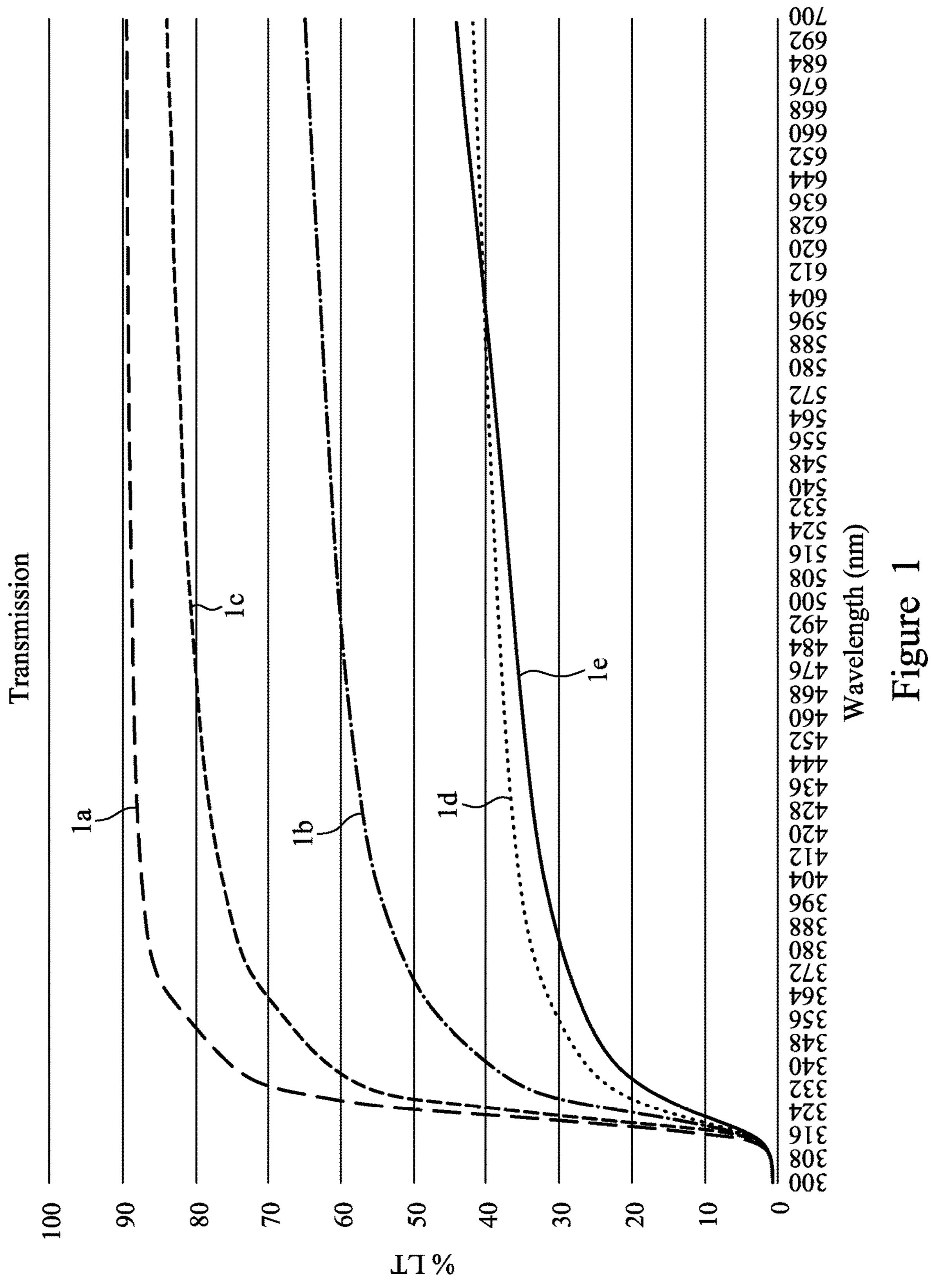
FIG. 1 is a graph of light transmission (LT %) v. wavelength for various different bottles, as described in Example 1.

The following materials are referred to hereinafter.

PMP TPX RT18 is a polymethylpentene copolymer, obtained from Mitsui Chemicals Inc.

Topas 6013 M-07—Cyclic olefin copolymer (COC) obtained from Topas Advanced Polymers. It has the following properties, assessed using the standards referred to:

| Property | Value | Unit | Test Standard |
|---|---|---|---|
| Melt volume rate (MVR) (260 °C, 2.16 kg) | 13 | $cm^3$/10 min | ISO 1133 |
| Tensile modulus (1 mm/min) | 2900 | Mpa | ISO 527-3 |
| Glass transition temperature (10 °C/min) | 142 | °C | ISO 11357-1, -2, -3 |
| DTUL @ 0.45 MPa | 130 | °C | ISO 75-1, -2 |

Topas 5013S-04—Cyclic olefin copolymer (COC) obtained from Topas Advanced Polymers. It has the following properties, assessed using the standards referred to:

| Property | Value | Unit | Test Standard |
|---|---|---|---|
| Melt volume rate (MVR) (260 °C, 2.16 kg) | 48 | $cm^3$/10 min | ISO 1133 |
| Tensile modulus (1 mm/min) | 3200 | Mpa | ISO 527-3 |
| Glass transition temperature (10 °C/min) | 134 | °C | ISO 11357-1,-2,-3 |
| DTUL @ 0.45 MPa | 127 | °C | ISO 75-1, -2 |

Topas 6013S-04—Cyclic olefin copolymer (COC) obtained from Topas Advanced Polymers. It has the following properties, assessed using the standards referred to:

| Property | Value | Unit | Test Standard |
|---|---|---|---|
| Melt volume rate (MVR) (260° C., 2.16 kg) | 14 | $cm^3$/10 min | ISO 1133 |
| Tensile modulus (1 mm/min) | 2900 | Mpa | ISO 527-3 |
| Glass transition temperature (10° C./min) | 138 | °C | ISO 11357-1, -2, -3 |
| DTUL @ 0.45 MPa | 130 | °C | ISO 75-1, -2 |

Topas 6015S-04—Cyclic olefin copolymer (COC) obtained from Topas Advanced Polymers. It has the following properties, assessed using the standards referred to:

| Property | Value | Unit | Test Standard |
|---|---|---|---|
| Melt volume rate (MVR) (260 °C, 2.16 kg) | 4 | $cm^3$/10 min | ISO 1133 |
| Tensile modulus (1 mm/min) | 3000 | Mpa | ISO 527-3 |
| Glass transition temperature (10 °C/min) | 158 | °C | ISO 11357-1, -2, -3 |
| DTUL @ 0.45 MPa | 150 | °C | ISO 75-1, -2 |

Topas 6017S-04—Cyclic olefin copolymer (COC) obtained from Topas Advanced Polymers. It has the following properties, assessed using the standard referred to:

| Property | Value | Unit | Test Standard |
|---|---|---|---|
| Melt volume rate (MVR) (260 °C, 2.16 kg) | 1.5 | $cm^3$/10 min | ISO 1133 |
| Tensile modulus (1 mm/min) | 3000 | Mpa | ISO 527-3 |

-continued

| Property | Value | Unit | Test Standard |
|---|---|---|---|
| Glass transition temperature (10 °C/min) | 178 | °C | ISO 11357-1, -2, -3 |
| DTUL @ 0.45 MPa | 170 | °C | ISO 75-1, -2 |

In general terms, PET-based bottle preforms are made by mixing materials with the PET which are intended to make a finished bottle made from the preform, appear white and opaque. The objective is to block light entering the bottle to prevent (or at least restrict) degradation of the bottle contents from certain wavelengths of visible light (in the range 300-700 nm).

The materials to be mixed with the PET are suitably provided as solid masterbatch pellets which is melt processed with the PET to produce a preform which is subsequently stretch-blow moulded to produce a bottle.

As will be apparent from the examples which follow, cyclic olefin copolymer (COC) has been found, in use, to be unexpectedly better at blocking light entering a bottle and/or has other advantageous properties compared to prior art materials.

In the following examples, Example 1 compares PET bottles incorporating various light blocking polymers; Example 2 makes comparisons of various light blocking formulations; Examples 3 and 4 assess colour of bottles incorporating various light blocking formulations; Example 5 assesses a range of alternative COCs; and Example 6 assesses bottles blown from preforms at differing blowing temperatures.

Example 1—Comparison of PET Bottles Incorporating Light-Blocking Polymers

PET-based bottles were made including COC, high impact polystyrene (HIPS) and/or TPX RT18. PP and HIPS were selected since they are referenced in prior patents. TPX RT18 is an example of a polymethylpentene (PMP) as described in prior publications WO2019/117725 and WO2019/133713.

Preforms were manufactured in a Husky GL160 injection moulder, with a two cavity mould installed. PET is weighed and premixed manually with the additional polymer at the required percentage and manually added into a hopper installed above the feed throat of the machine. A standard PET injection moulding process was employed to produce preforms. The resulting preforms were then stretch blow moulded using a Sidel SB01 blow moulding machine into 1 litre cylindrical bottles.

Details on the examples are provided in the table below.

| Example No. | Additional polymer included with PET | wt % of additional polymer included |
|---|---|---|
| 1a | No additional polymer | — |
| 1b | PP | 1 |
| 1c | HIPS | 1 |
| 1d | TPX RT18 (PMP) | 1 |
| 1e | Topas 6013 M (COC) | 1 |

Light transmission of each bottle was assessed on a cut section from the bottle wall, using a Shimadzu UV Visible Spectrophotometer with an integrating sphere, across the wavelength range 300-700 nm.

Results are provided in FIG. 1 which shows that PP and HIPS are not as effective alone at blocking light when compared to the COC and PMP materials. Advantageously, the light transmission when COC is used (Example 1e) is lowest (meaning light blocking is highest).

Example 2—Comparisons of Light Blocking Using Various Light-Blocking Formulations Masterbatch formulations, based on formulations described in EP3023458A (and incorporating COC or PMP, the latter for comparison purposes), were prepared as described in the table below.

| Example No. | 2a | 2b | 2c | 2d |
|---|---|---|---|---|
| HIPS | | 7.8 | | 7.8 |
| PMP RT18 | 59.23 | 26 | | |
| COC 6013M-07 | | | 59.23 | 26 |
| Titanium Dioxide white pigment | 40 | 65 | 40 | 65 |
| Iron Oxide black pigment | 0.07 | | 0.07 | |
| Aluminium paste | 0.7 | 1.2 | 0.7 | 1.2 |
| TOTAL | 100 | 100 | 100 | 100 |

As will be appreciated, Examples 2a and 2c are directly comparable (they differ only in the identity of polymers incorporated—i.e. PMP or COC) and examples 2b and 2d are directly comparable (they too differ only in the identity of polymers incorporated—i.e. PMP or COC).

Preforms were made using a Husky GL160 injection moulder and preforms subsequently blown as described in Example 1. The preforms made from examples 2a and 2c masterbatches included 10 wt % of the masterbatches; and the preforms made from examples 2b and 2c masterbatches included 6 t % of the masterbatches. The masterbatch addition rates were selected to ensure the blown bottles included no more than 4 wt % of titanium dioxide.

Figure 2:
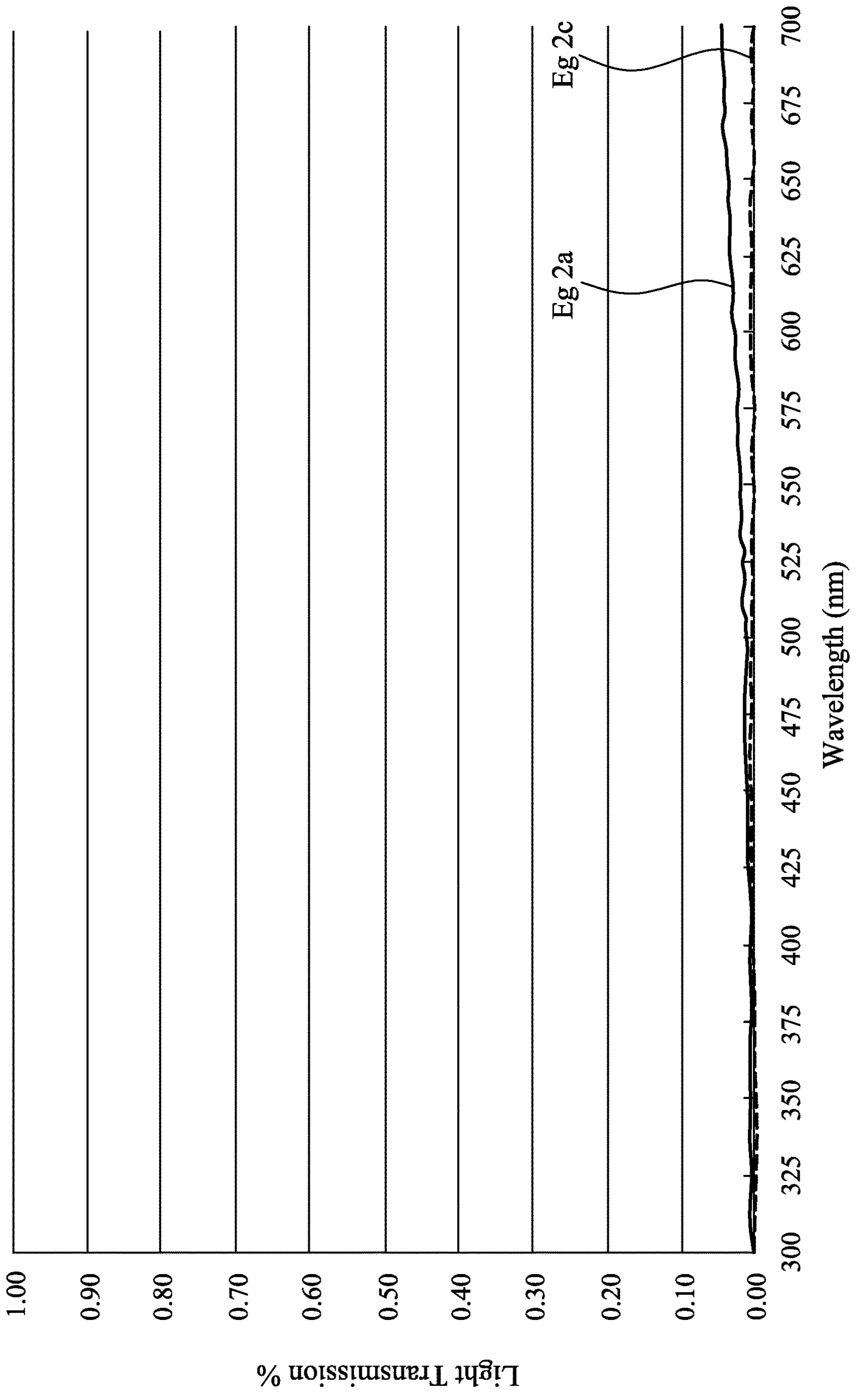
FIG. 2 is a graph of light transmission (LT %) v. wavelength for a for PMP vs COC as formulations as described in Example 2.

The light transmission of the blow bottles of Examples 2a and 2c were assessed as described in Example 1 and results are presented in FIG. 2. The figure shows that the bottle incorporating the formulation of Example 2c (which includes COC) has better light blocking compared to the comparative Example incorporating the formulation of Example 2a (which includes PMP).

Example 3—Colour Comparisons of Bottles Including Light-Blocking Formulations

The colours of bottles incorporating PMP or COC and being made as described in Example 2 were assessed using a Minolta CM3600d spectrophotometer in reflectance mode. Results are provided for L*, a* and b* in the table below.

| Example No. | Masterbatch formulation of Example No. | Mean L* (D65) | Mean a* (D65) | Mean b* (D65) |
|---|---|---|---|---|
| 3a | 2a at 10 wt % | 92.64 | −0.57 | −0.29 |
| 3b | 2c at 10 wt % | 93.80 | −0.42 | 0.12 |
| 3c | 2b at 6 wt % | 89.84 | −1.08 | −1.56 |
| 3d | 2d at 6 wt % | 92.37 | −0.73 | −0.72 |

It should be noted from the results that the COC-based formulation of Example 3b has a higher L* in comparison to the PMP-based formulation of Example 3a; and, similarly, the COC-based formulation of Example 3d has a higher L* compared to the PMP-based formulation of Example 3c. In addition, the COC-based formulations lead to lower b values (less blue colour) which is preferred.

Thus, advantageously, COC-based formulations have improved lightness and/or colour relative to comparable examples.

Example 4—Colour Comparison in Formulation with Titanium Dioxide

The colours of PET bottles incorporating PMP or COC and 4 wt % titanium dioxide, made as described in Example 1, were assessed as described in Example 2. Results are provided in the table below. Note that Comparative Example 4a is a commercially available product of the type described in EP 3023458 A.

| Example No. | Detail on composition | Mean L* (D65) | Mean a* (D65) | Mean b* (D65) |
|---|---|---|---|---|
| 4a | Commercially available product of type described in EP 3023458 A | 91.16 | −1 | −1.97 |
| 4b | $TiO_2$ (4 wt %), COC (4 wt %), balance PET | 96.41 | −0.38 | 1.61 |

It should be appreciated that, compared to Example 4a, Example 4b (which includes COC) is significantly lighter (higher L*) and yellower (higher b*).

Example 5—Assessment of Alternative COCs

Following the procedure described in Example 1, PET-based bottles were made including a number of alternative commercially-available COCs, as follows:

| Example No. | COC |
|---|---|
| 5a | Topas 5013S-04 |
| 5b | Topas 6013S-04 |
| 5c | Topas 6015S-04 |
| 5d | Topas 6017S-04 |
| 5e | No COC |

Figure 3:
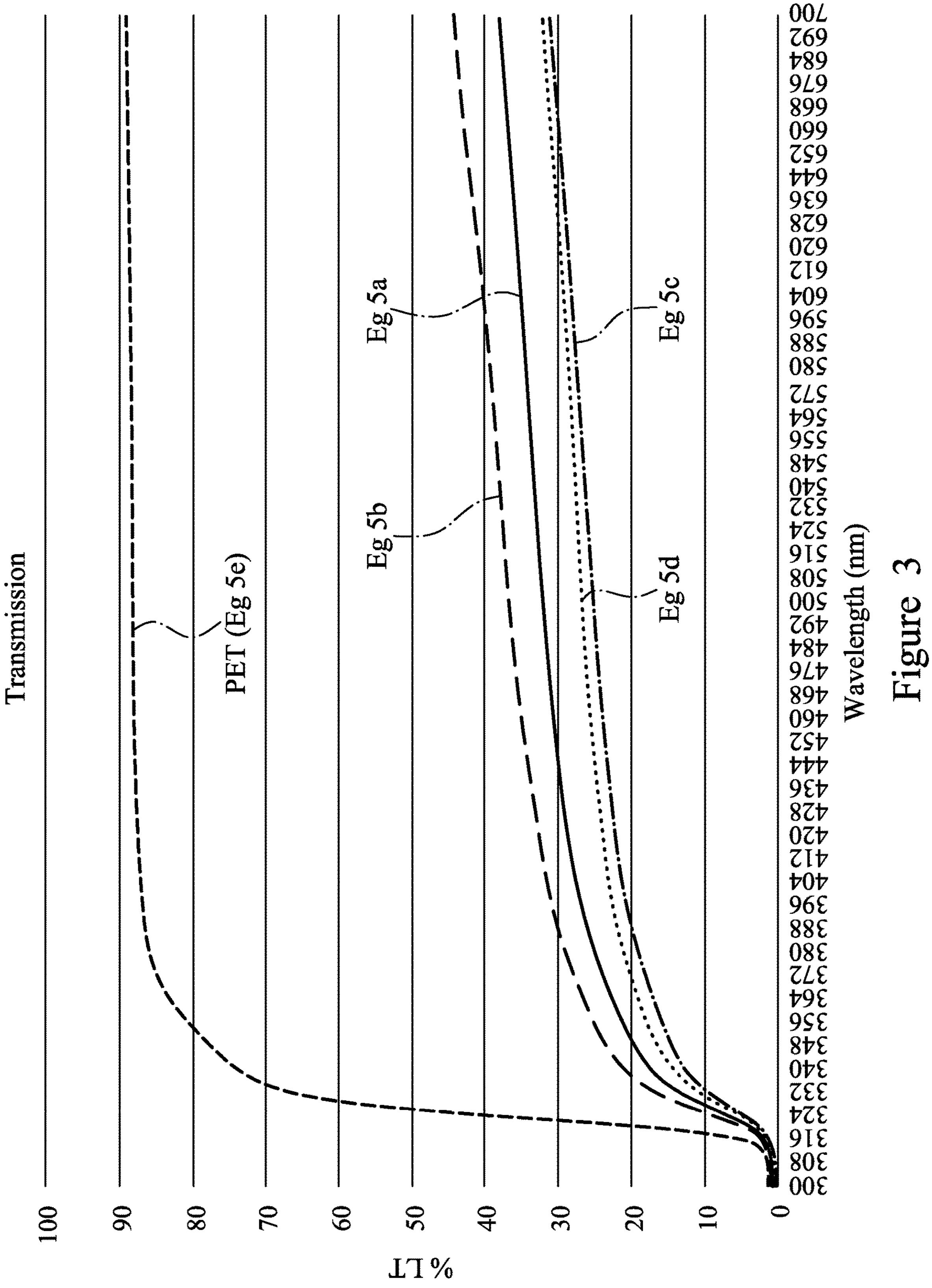
FIG. 3 is a graph of light transmission (LT %) v. wavelength for a series of bottles incorporating different cyclic olefin copolymers.

FIG. 3 includes results of light transmission (LT %) v. wavelength for the examples. Incorporation of each of the COCs is found to significantly reduce light transmission.

Example 6—Assessment of Bottles Blown from Preforms at Different Blowing Temperatures A number of identical PET preforms were made incorporating 1 wt % of Topas 6013M and the preforms were then blown on a Sidel SB01 blowing machine. The oven profile was set to achieve a good quality bottle with a uniform material distribution. The overall power of the ovens was adjusted by increasing the AL+ % figure, to increase the preform temperature as it exited the ovens and before it entered the blow mould (the blowing temperature). The higher the AL+ %, the higher the preform temperature.

Light transmission was checked on a cut section from the bottle wall using a Shimadzu UV Visible Spectrophotometer with an integrating sphere, across the wavelength range 300-700 nm. Wall thickness was measured using a Magna Mike.

The table below details bottles assessed.

| Example No | Blowing temperature (° C.) | Wall thickness (μm) |
|---|---|---|
| 6a | 108 | 313 |
| 6b | 120 | 293 |
| 6c | 140 | 302 |
| 6d | 150 | 317 |

Figure 4:
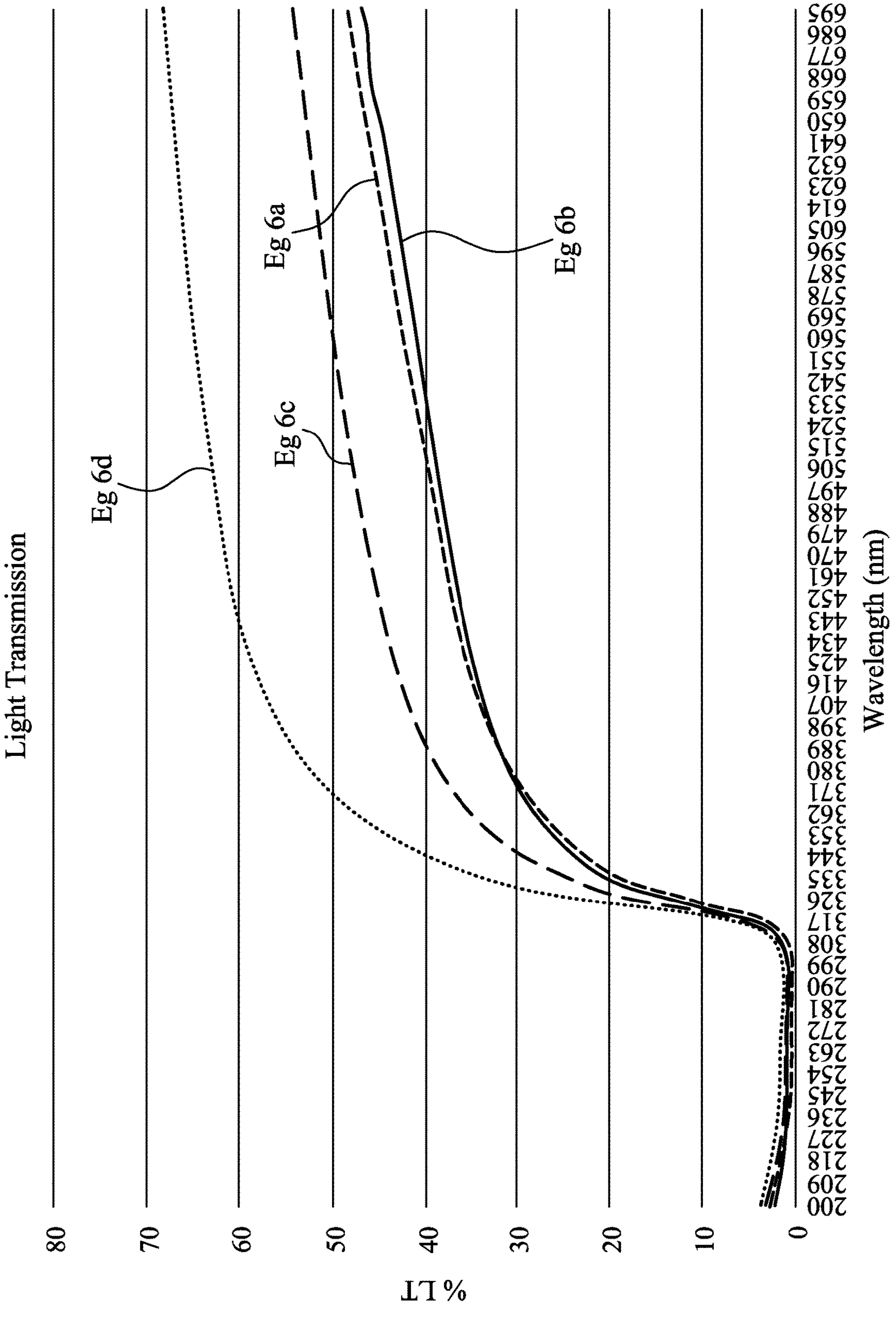
FIG. 4 is a graph of light transmission (LT %) v. wavelength for a range of bottles blown at different blowing temperatures.

Results are provided in FIG. 4 which shows that, when the blowing temperature is high (about 150° C. as in Example 6d), the opacity is greatly reduced (i.e. the light transmission LT % is high). Opacity increases as the blowing temperature is reduced (see Example 6c) but there comes a point where reducing blowing temperature beyond a certain limit (e.g. 140° C.—compare Examples 6a and 6b) has minimal effect on light transmission (LT %)—i.e. the LT % is almost identical for Examples 6a and 6b.

It is believed the effect of blowing temperature may be related to the glass transition temperature (Tg) of the COC. As described above, the COC has a Tg of 142° C. Thus, Applicant concludes that it is preferred for the bottle to be blown at a temperature below the Tg of the COC and preferably 10 to 20° C. below the Tg.

Thus, COCs as described are advantageous when used in PET bottles and may be used to protect the contents of such bottles, with the bottles advantageously appearing white.

Example 7—Assessment of Effect of COC and PMP on Oxygen-Scavenging Polymer

Figure 5:
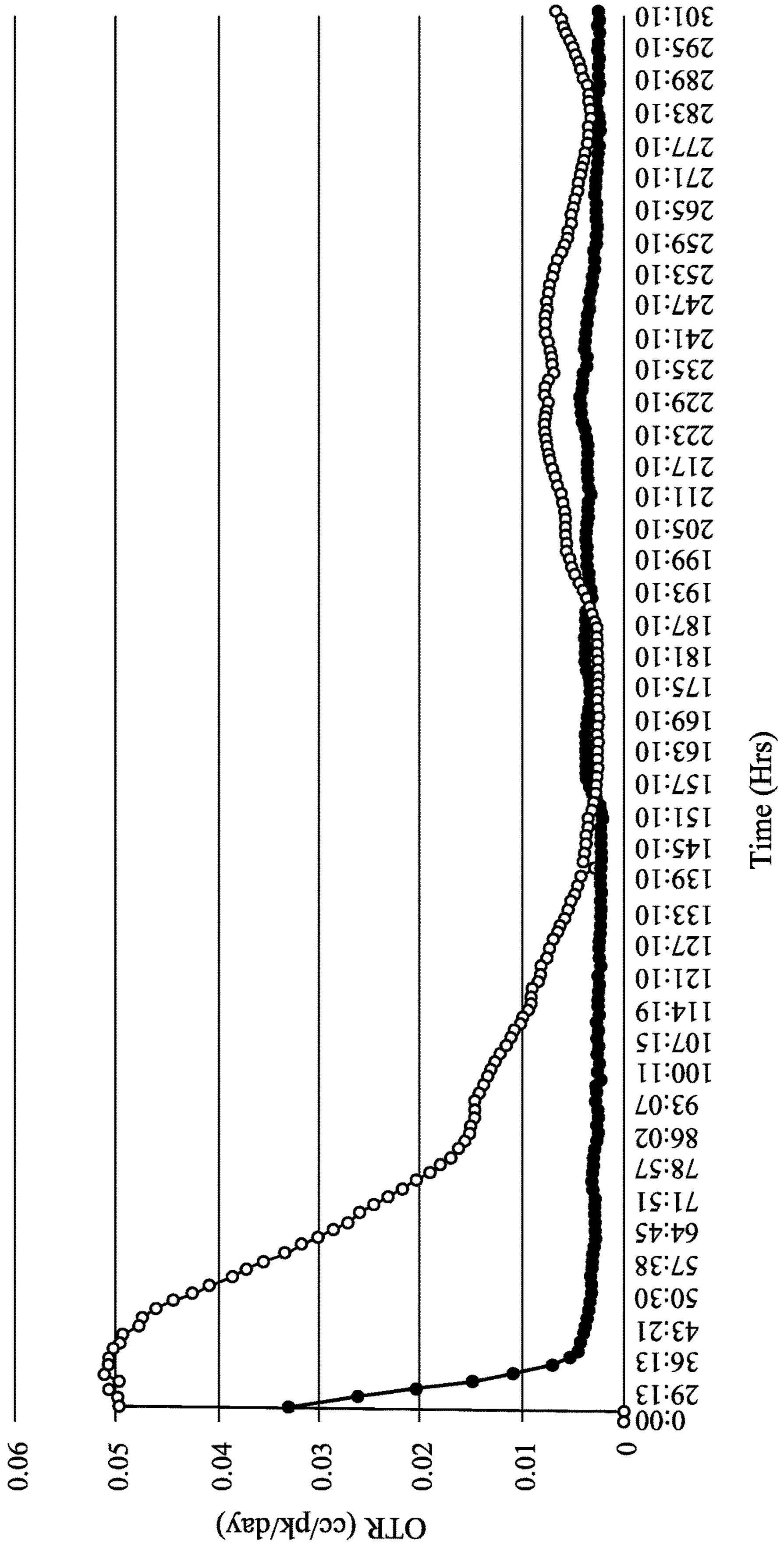
FIG. 5 is a graph of Oxygen Transmission Rate (OTR) v time for bottles which include an oxygen scavenger (AMOSORB™) and a cyclic olefin copolymer or polymethylpentene copolymer.

Bottles were blown from preforms including 5 wt % AMOSORB 4020E, a commercially available oxygen scavenging formulation which includes polybutadiene moieties and is of a type described in U.S. Pat. No. 6,083,585, in combination with either a COC or PMP. The bottles were then assessed using standard techniques to determine how long it took for the AMOSORB to be activated (ie to start scavenging oxygen in the bottle). Results are provided in FIG. 5 which show that for the COC-containing bottle the AMOSORB is activated normally (ie rapidly), whereas, disadvantageously, for the PMP-containing bottle there is a substantial delay before the AMOSORB is activated.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A container body which comprises:

(i) a polymer which is a polyethylene terephthalate and a cyclic olefin copolymer (COC), (ii) wherein said COC includes a repeat unit of formula (I)

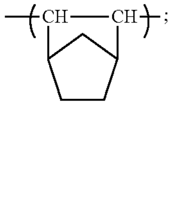

;

and a repeat unit of formula $$-\!\left(CH_2-CH_2\right)\!- \quad (II)$$

wherein said container body has a L* value, measured on the CIELAB scale, of at least 85;

wherein said container body includes a first light shielding pigment;

wherein said container body includes a second light shielding pigment;

wherein said first and second light shielding pigments are different and do not include all of the same elements; and wherein said container body defines a stretch blow moulded bottle.

2. A container body according to claim 1, wherein a ratio (A) defined as the weight of polymer divided by the weight of COC in the container body is in the range 8 to 65.

3. A container body according to claim 2, wherein said ratio (A) is in the range 30-39; or in range 9-15.

4. A container body according to claim 3, wherein said container body includes 1 to 10 wt % of COC.

5. A container body according to claim 2, wherein said COC includes at least 40 mol % of said repeat unit of formula I and less than 70 mol % of said repeat unit of formula I; and said COC includes less than 60 mol % of said repeat unit of formula II and at least 30 mol % of said repeat unit of formula II.

6. A container body according to claim 2, wherein said COC has a glass transition temperature (Tg) of greater than 100° C.

7. A container body according to claim 1, wherein the sum of the wt % of thermoplastic polymers in said container body is at least 94 wt %.

8. A container body according to claim 2, wherein said container body includes no more than 4 wt % of said first light shielding pigment.

9. A container body according to claim 8, wherein said first light shielding pigment is selected from: titanium dioxide ($TiO_2$), ultramarine blue, metal oxide particles, red iron oxide, black iron oxide, chromium green-black hematite, cobalt aluminate, aluminium trihydrate (Al(OH)3), barium sulfate ($BaSO_4$), zinc sulfide (ZnS), metal flake, calcium carbonate and mica, wherein said container body includes 1 to 4 wt % of said first light shielding pigment.

10. A container body according to claim 8, wherein said first light shielding pigment is titanium dioxide.

11. A container body according to claim 2, wherein said container body includes no more than 4 wt % of titanium dioxide.

12. A container body according to claim 9, wherein said second light shielding pigment is selected from titanium dioxide ($TiO_2$), ultramarine blue, red iron oxide, black iron oxide, chromium green-black hematite, cobalt aluminate, aluminium trihydrate (Al(OH)3), barium sulfate ($BaSO_4$), zinc sulfide (ZnS), metal flake, calcium carbonate and mica.

13. A container body according to claim 1, wherein said container body includes 85-95 wt % polyethylene terephthalate, 1-8 wt % titanium dioxide, 1-8 wt % of COC, 0.01 to 1 wt % of aluminium flake or powder and 0 to 1.5 wt % of a polymer which is incompatible/immiscible with the polyethylene terephthalate.

14. A container body according to claim 1, wherein said container body includes 85-95 wt % polyethylene terephthalate, 1-5 wt % titanium dioxide, 1-7 wt % of COC, 0.01 to 0.5 wt % of aluminium flake or powder and 0 to 1.5 wt % of a polymer which is incompatible/immiscible with the polyethylene terephthalate.

15. A container body which comprises a polymer and a cyclic olefin copolymer (COC), wherein a ratio (A) defined as the weight of polymer divided by the weight of COC in the container body is in the range 8 to 65, wherein said container body has a L* value, measured on the CIELAB scale, of at least 85 and wherein said container body defines a stretch blow moulded bottle.

16. A container body according to claim 1, wherein said container body incorporates an oxidizable organic material for scavenging oxygen in use.

17. A preform for making a container body which is a stretch blow moulded bottle according to claim 1, the preform comprising:

(i) a polyethylene terephthalate;

(ii) a cyclic olefin copolymer (COC).

18. A preform according to claim 17, wherein:

the sum of the wt % of polyester(s) and COC(s) in said preform is at least 94 wt %;

said preform includes only one layer of material;

said preform includes a first light shielding pigment selected from: titanium dioxide ($TiO_2$), ultramarine blue, red iron oxide, black iron oxide, chromium green-black hematite, cobalt aluminate, aluminium trihydrate (Al(OH)3), barium sulfate ($BaSO_4$), zinc sulfide (ZnS), metal flake, calcium carbonate and mica;

said preform includes a second light shielding pigment selected from titanium dioxide ($TiO_2$), ultramarine blue, red iron oxide, black iron oxide, chromium green-black hematite, cobalt aluminate, aluminium trihydrate (Al(OH)3), barium sulfate ($BaSO_4$), zinc sulfide (ZnS), metal flake, calcium carbonate and mica;

said first and second light shielding pigments are different and/or do not include all of the same elements.

19. A preform according to claim 17, wherein:

a ratio (C) defined as the weight of polyester divided by the weight of COC in the preform is in the range 8 to 65;

a ratio (D) defined as the weight of polyester divided by the weight of COC in a layer of the preform is in the range 8 to 65;

said preform includes 1 to 10 wt % of COC and 80 to 99 wt % of polyester;

said preform includes an injection moulding which is test-tube shaped;

said preform includes a first light shielding pigment which is titanium dioxide.

20. A container body which comprises:

(i) a polymer which is a polyethylene terephthalate; and (ii) a cyclic olefin copolymer (COC);

wherein said container body includes 85-95 wt % polyethylene terephthalate, 1-8 wt % titanium dioxide, 1-8 wt % of COC, 0.01 to 1 wt % of aluminum flake or powder;

wherein said container body has L* value, measured on the CIELAB scale of at least 85; and wherein said container body defines a bottle.

21. A container body according to claim 1, wherein said container body includes a screw-threaded neck arranged to cooperate with a screw-threaded closure.

22. A container body according to claim 21, wherein a side wall of said container body is defined by a single layer, wherein said sidewall has a thickness of at least 200 microns.

* * * * *